United States Patent
Cammack (10) Patent No.: US 11,662,710 B2
(45) Date of Patent: May 30, 2023

(54) SYSTEM AND METHOD FOR PRODUCING WILDLIFE REPRODUCTIONS AND GAME FISH REPLICAS

(71) Applicant: Chris Lee Cammack, Cypress, TX (US)

(72) Inventor: Chris Lee Cammack, Cypress, TX (US)

(*) Notice: Subject to any disclaimer, the term of this patent is extended or adjusted under 35 U.S.C. 154(b) by 0 days.

(21) Appl. No.: 17/420,271

(22) PCT Filed: Apr. 3, 2020

(86) PCT No.: PCT/US2020/026557
§ 371 (c)(1),
(2) Date: Jul. 1, 2021

(87) PCT Pub. No.: WO2020/206237
PCT Pub. Date: Oct. 8, 2020

(65) Prior Publication Data
US 2022/0066417 A1    Mar. 3, 2022

Related U.S. Application Data

(60) Provisional application No. 62/830,080, filed on Apr. 5, 2019.

(51) Int. Cl.
*G05B 19/4099* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/35134; G05B 2219/49023; B29C 64/386; B33Y 50/00;
(Continued)

(56) References Cited

U.S. PATENT DOCUMENTS

2008/0088704 A1* 4/2008 Wendelken ............... G06T 7/62
348/188
2009/0074244 A1* 3/2009 Sloan ..................... G06V 10/56
382/103
(Continued)

FOREIGN PATENT DOCUMENTS

JP        2015049806 A  *  3/2015

OTHER PUBLICATIONS

International Searching Authority, International Search Report and Written Opinion, dated Aug. 10, 2020, (13 pages).
(Continued)

*Primary Examiner* — Yuhui R Pan
(74) *Attorney, Agent, or Firm* — Barclay Damon LLP (57) ABSTRACT

A system and method for fabricating replicas of wildlife reproductions. The system includes a scanner configured to optically acquire digital images of wildlife subjects, a three-dimensional printer operative to produce a three-dimensional reproduction of wildlife subjects and a processor issuing command signals to the three-dimensional printer to print the digital image file of the selected wildlife subject. The digital images of each wildlife subject being saved to a library of digital image files within a computer database. The processor, furthermore, includes program code for accessing the library of digital image files which is responsive to an input command signal which selects the three-dimensional digital image file of the wildlife subject.

11 Claims, 8 Drawing Sheets

(51) Int. Cl.
  *G06T 7/55* (2017.01)
  *G06T 7/90* (2017.01)
  *B29C 64/386* (2017.01)
  *H04N 13/20* (2018.01)
  *B33Y 30/00* (2015.01)
  *B33Y 80/00* (2015.01)
  *B29L 31/00* (2006.01)

(52) U.S. Cl.
  CPC .............. *G06T 7/55* (2017.01); *G06T 7/90* (2017.01); *H04N 13/20* (2018.05); *B29L 2031/702* (2013.01); *B33Y 30/00* (2014.12); *B33Y 80/00* (2014.12); *G05B 2219/35134* (2013.01); *G05B 2219/49023* (2013.01)

(58) Field of Classification Search
  CPC ........... B33Y 30/00; B33Y 80/00; G06T 7/55; G06T 7/90; H04N 13/20; B29L 2031/702
  See application file for complete search history.

(56) References Cited

U.S. PATENT DOCUMENTS

| | | |
|---|---|---|
| 2009/0303507 A1 | 12/2009 | Abeloe |
| 2014/0279177 A1* | 9/2014 | Stump ............... G06Q 30/0611 705/26.4 |
| 2016/0297149 A1 | 10/2016 | Albert et al. |
| 2017/0270712 A1 | 9/2017 | Tyson et al. |

OTHER PUBLICATIONS

International Peliminary Examining Authority, International Preliminary Report on Patentability, dated May 17, 2021 (13 pages).

Michael Groenendyk, A Further Investigation into 3D Printing and 3D Scanning at the Dalhousie University Libraries: a Year Long Case Study, Apr. 24, 2013, (15 pages).

Manzano et al., Using Digital 3D Scanning to Create "Artifictions" of the Passenger Pigeon and Harelip Sucker, Two Extinct Species in Eastern North America: The Future Examines the Past, Society of Ethnobiology, Dec. 18, 2015 (11 pages).

Tess, Cherish your furry friends with miniature 3D printed pet models, www.3ders.org., Feb. 6, 2018, (3 pages).

Sanders, Furever3D Will 3D Print Miniature Replicas of Your Furry Friends Using Your Photos, Jan. 8, 2017, (4 pages).

* cited by examiner

SYSTEM AND METHOD FOR PRODUCING WILDLIFE REPRODUCTIONS AND GAME FISH REPLICAS

RELATED APPLICATIONS

This application claims the benefit of, and priority to, provisional patent application Ser. No. 62/830,080 entitled "SYSTEM AND METHOD FOR PRODUCING WILDLIFE REPRODUCTIONS AND GAME FISH REPLICAS", filed on Apr. 5, 2019. The complete specification of these applications are hereby incorporated by reference in their entirety.

TECHNICAL FIELD

This disclosure relates to systems and methods for fabricating wildlife reproductions and, more particularly, to a new and useful system and method for rapidly and cost effectively producing wildlife reproductions using a mobile device. The system and method facilitates the production of replicas which vary in size while decreasing the inventory of molds typically required for fabricating such replicas.

BACKGROUND

"Taxidermy" is the art of arranging/moving the skin of an animal in a life-like form (i.e., taxi+dermis=moving the skin). While many believe that "stuffing" the skin or carcass is part of the taxidermy process, more commonly, molds are employed/developed for preparing a replica of the animal or game fish.

With respect to game fish, two techniques are commonly employed, namely, "skin-mounting" and "mold fabrication." With respect to the former, the taxidermist carefully peels off the scaled skin of the fish, treats the peeled skin with a preservative, and reapplies the preserved skin to a mannequin-like support, i.e., a Styrofoam mold or mandrel. Parts such as the head and fins may be treated with formaldehyde and glued to the body. Thereafter, the entire fish is painted to replicate the colors of the fish in its natural environment.

With respect to the former, upon arrival, the fish is initially molded using a plaster cast. After about twelve (12) hours, the cast is split in halves to reveal the outer mold line (OML) of the game fish such that a resin-impregnated, fiber-reinforced, fiberglass material may be molded from the OML of the fish. This is also known as making a "splash" from the plaster cast mold. Once cured, the fiberglass halves are trimmed and glued together to produce a cured composite replica of the game fish, which replica is ready for painting.

The particular method selected by a client depends on whether they seek to preserve the fish that was actually caught, or simply produce trophy-like remembrance of the fish. Since the skin-mounted technique uses the actual fish to form the shape of the outer contour, one can still touch the fish that was caught on that memorable day. Unfortunately, the fish oils, over time, will degrade the formaldehyde and glues employed to assemble the replica. Hence, a skin-mounted technique has a finite life.

The mold fabrication technique captures the essence of the fish by obtaining a three-dimensional mold of the actual fish caught. However, since the mold fabrication technique employs man-made materials, the replica will generally live longer than the client and/or the client's memory.

Additionally, with the popularity of "catch and release," a client need only provide its dimensions and a photograph of the game fish to produce a life-like replica. That is, inasmuch as molds are available from an extensive inventory of molds (i.e., mold which closely replicate the fish caught), an angler need not remove a majestic or long-living creature from its natural environment. That is, the fish can be released while the angler need not skin the fish to have a life-like replica.

Accordingly, there is a need to overcome, or otherwise lessen the effects of, the disadvantages and shortcomings described above.

SUMMARY

A system is disclosed for fabricating replicas of wildlife reproductions. The system includes a scanner configured to optically acquire digital images of wildlife subjects, a three-dimensional printer operative to produce three-dimensional reproductions of wildlife subjects, and a processor configured to issue command signals to the three-dimensional printer to print the three-dimensional digital image file of the selected wildlife subject. The digital images of each wildlife subject are saved to a library of digital image files within a computer database. The processor accesses the digital image files, retrieves a selected wildlife subject, and issues a command signal to the three-dimensional printer to print the selected 3D digital image file.

In another embodiment, the system fabricates replicas of wildlife reproductions wherein the processor is responsive to a dimensional adjustment command signal indicative of at least one principal dimension. The principal dimension represents a characteristic feature/dimension of the selected wildlife subject from which other dimensions of the selected wildlife subject may be calculated, generally for enlargement.

In yet another embodiment, the system employs a first reference device, imaged along with the scanned wildlife subject, to facilitate the accurate rendering of geometric features, a second reference device, imaged with the scanned wildlife subject, to facilitate the accurate rendering of the chromaticity coordinates of the wildlife subject, and a mobile device to: (i) acquire the three dimensional image of the wildlife subject (ii) upload the image data for comparing the acquired image data with a library of known images, (iii) select a variety of preferences associated with fabricating the wildlife reproduction and (iv) order information for fabricating and delivering the wildlife reproduction.

BRIEF DESCRIPTION OF THE DRAWINGS

Additional features and advantages of the present disclosure are described in, and will be apparent from, the following Brief Description of the Drawings and Detailed Description.

DETAILED DESCRIPTION

The present disclosure relates to a system and method for fabricating wildlife reproductions and, more particularly, to a new and useful method and system for rapidly and cost effectively producing wildlife reproductions by facilitating the production of replicas which vary in size, reducing the inventory of molds required for producing replicas and employing rapid prototyping tools for integrating complex details of replica fabrication, e.g., color and texture.

In the context used herein, a "wildlife reproduction" is any replica of a wildlife subject, whether the replica is a reproduction of the entire subject, e.g., an entire stuffed animal such as a might be produced for a museum exhibit, or reproduction of a smaller portion of the whole, e.g., a shoulder mounted buck or moose for display in a game room. While the system and method for producing the wildlife replica is described in the context of a game fish, it will be appreciated that the present disclosure is applicable to any wildlife subject including those having scales or fur for an external geometry or contour.

In FIGS. 1 through 5, a system 10 is disclosed for fabricating a wildlife reproduction comprising: a scanner 100, a processor 200, a three-dimensional digital image file 300 containing saved three-dimensional images of wildlife subjects, and a three-dimensional printer 400 with a printing area 410. The scanner 100 is configured to create three-dimensional digital images of a wildlife subject 20. The three-dimensional printer 400 is configured to print a three-dimensional reproduction 500 of the wildlife subject 20 from the digital image file 300.

Figure 2:
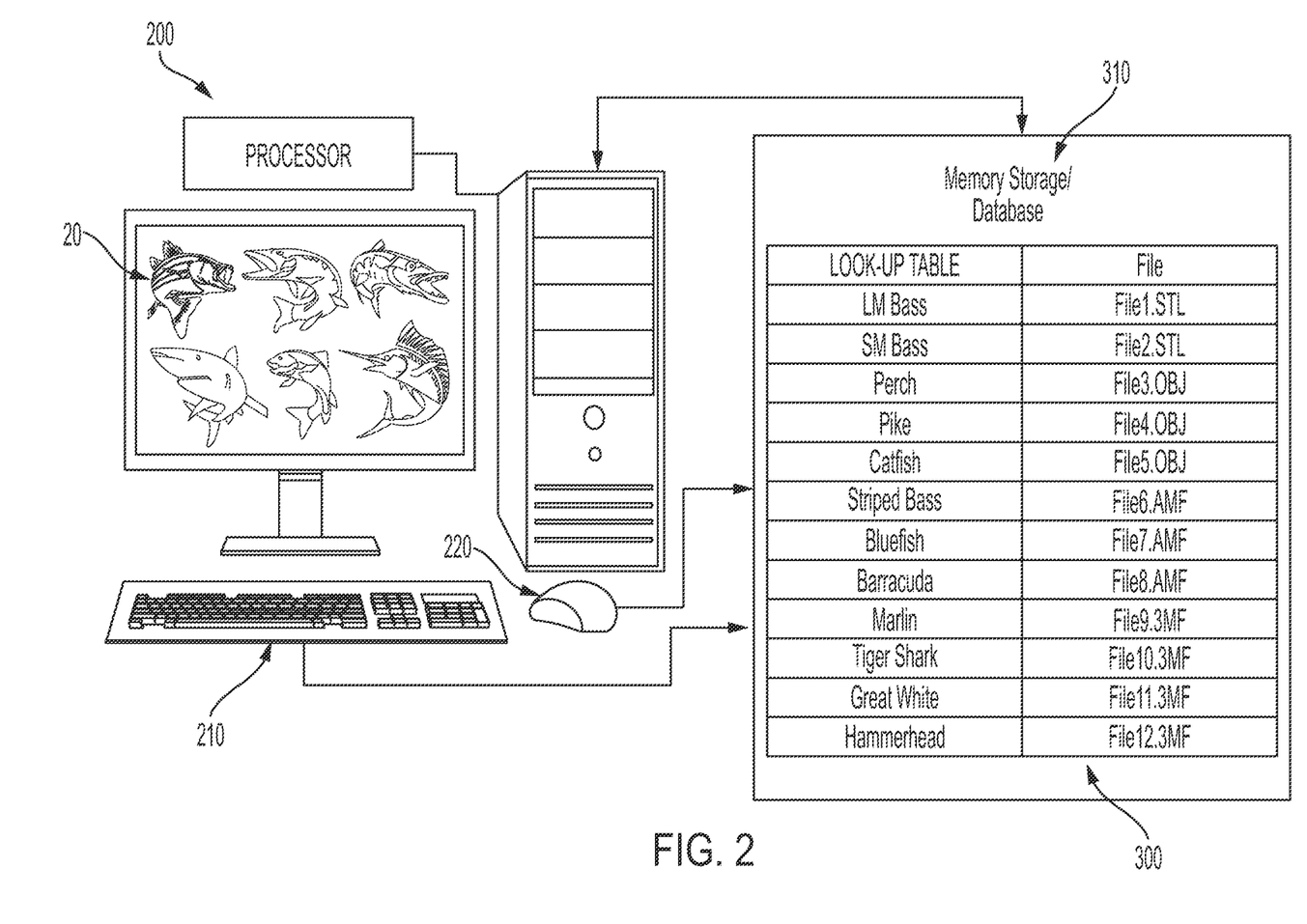
FIG. 2 is an isolated schematic perspective view of a computer/processor including a memory device for storing and retrieving three-dimensional digital image files including a principle dimension useful for adjusting/modifying the size of a wildlife replica.

Finally, the computer processor 200 receives and saves the digital image files 300 in a computer database 310 (as seen in FIG. 2.) The processor 200, furthermore, issues command signals to the three-dimensional printer 400 for rendering the three-dimensional replica 500 of the wildlife subject 20. The three-dimensional printer 400 may receive the digital image file 300, e.g., .STL, .OBJ, .AMF or .3MF, directly from the scanner 100 (i.e., a file rendered by the processor 200,) or receive a digital image file 300 from a library of digital image files.

Figure 5:
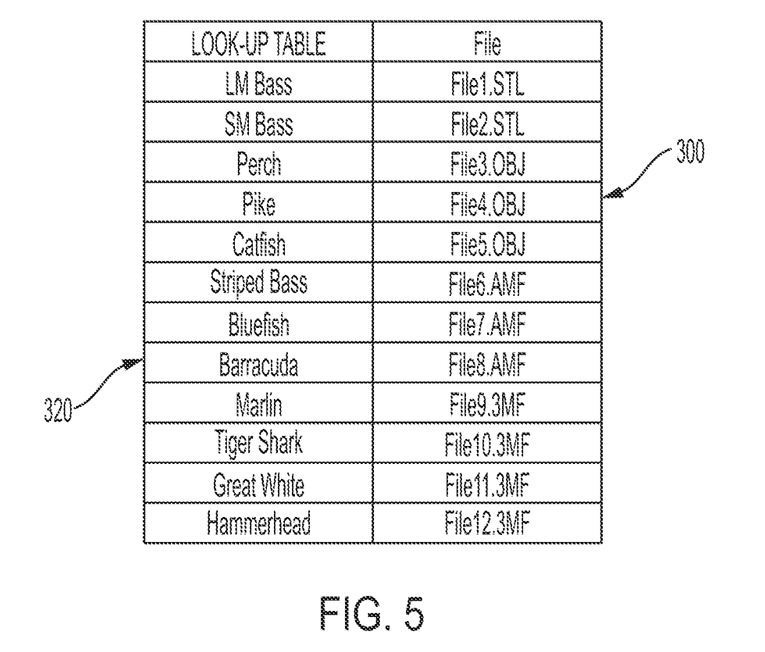
FIG. 5 depicts a look-up table for cross-referencing the game fish with a 3D dimensional digital image file saved in the computer database.

With respect to the latter, the look-up table 320 cross-references the digital image files 300 containing a library of wildlife image files e.g., files of a largemouth bass, perch, pike, marlin, etc., from which a wildlife subject may be selected and printed. When selecting a wildlife subject 20, other dimensional and external appearance data may be obtained from a library of dimensions, photographs, photogrammetry and chromaticity coordinates. These will be discussed in greater detail below when discussing the method steps for fabricating a wildlife reproduction.

In one embodiment, the processor 200 may be responsive to a dimensional adjustment signal indicative of at least one principal dimension. In the context used herein, the "principal dimension" is a characteristic feature or dimension of the selected (220) wildlife subject 20 from which dimensional adjustments to at least one other dimension of the selected wildlife subject 20 may be obtained or calculated.

Figure 6:
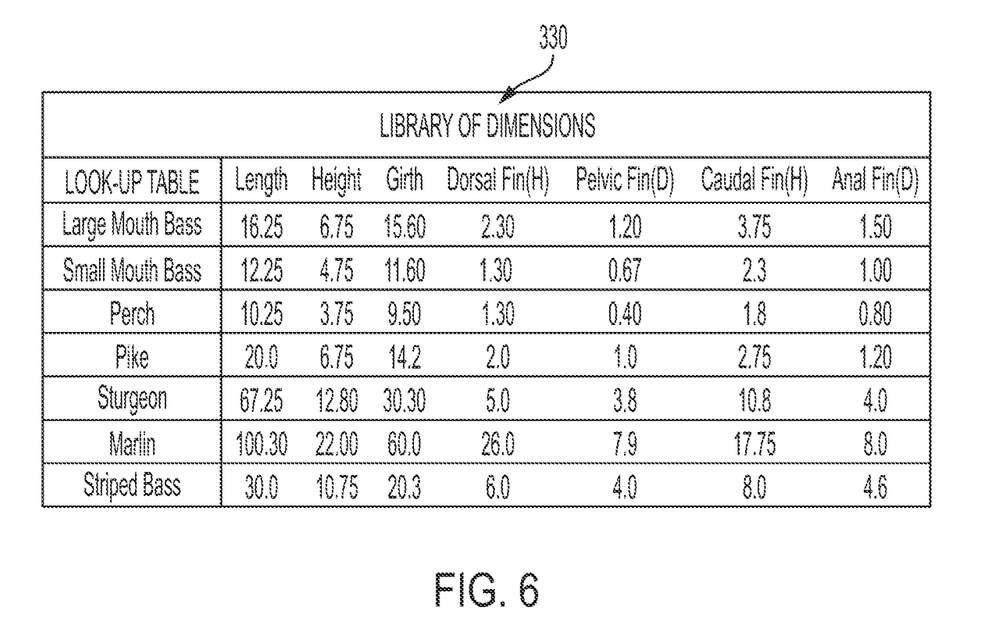
FIG. 6 depicts a table which correlates a principal dimension with other dimensions of a wildlife subject.

For example, a principal dimension of a largemouth bass may be its "girth" dimension. That is, the girth dimension of a largemouth bass may be one of the best dimensions from which to base the calculation of other dimensions, such as the length or height of the game fish. Consequently, when selecting a girth dimension of, for example, 15.60 inches, the length dimension may be calculated to be approximately 16.25 inches in length. It will, of course, be recognized that the various dimensions may be calculated or estimated using a variety of methods. For example, algebraic formula may be employed or a library of dimension data 330 wherein dimensions therefrom may be interpolated or extrapolated based on the intervening or related data.

In theory, the system and method enables a user to print a three-dimensional image of any wildlife subject, such as a gamefish, for which at least one digital image file exists. For example, assuming: (i) that the principle dimension for a "pike" is its girth dimension, and (ii) a sportsman/angler lands a Pike having a girth measurement of twenty-eight and four-tenths inches (28.4"), then, a gamefish replica of approximately forty inches (40.0") might be expected. It should be appreciated, however, that the dimensional library is only a guide regarding the anticipated size of the game fish and will not be the actual data used to print the three-dimensional digital image. It will also be appreciated that the digital image file can be modified in a variety of ways to increase or decrease the size of the selected gamefish.

Figure 1:
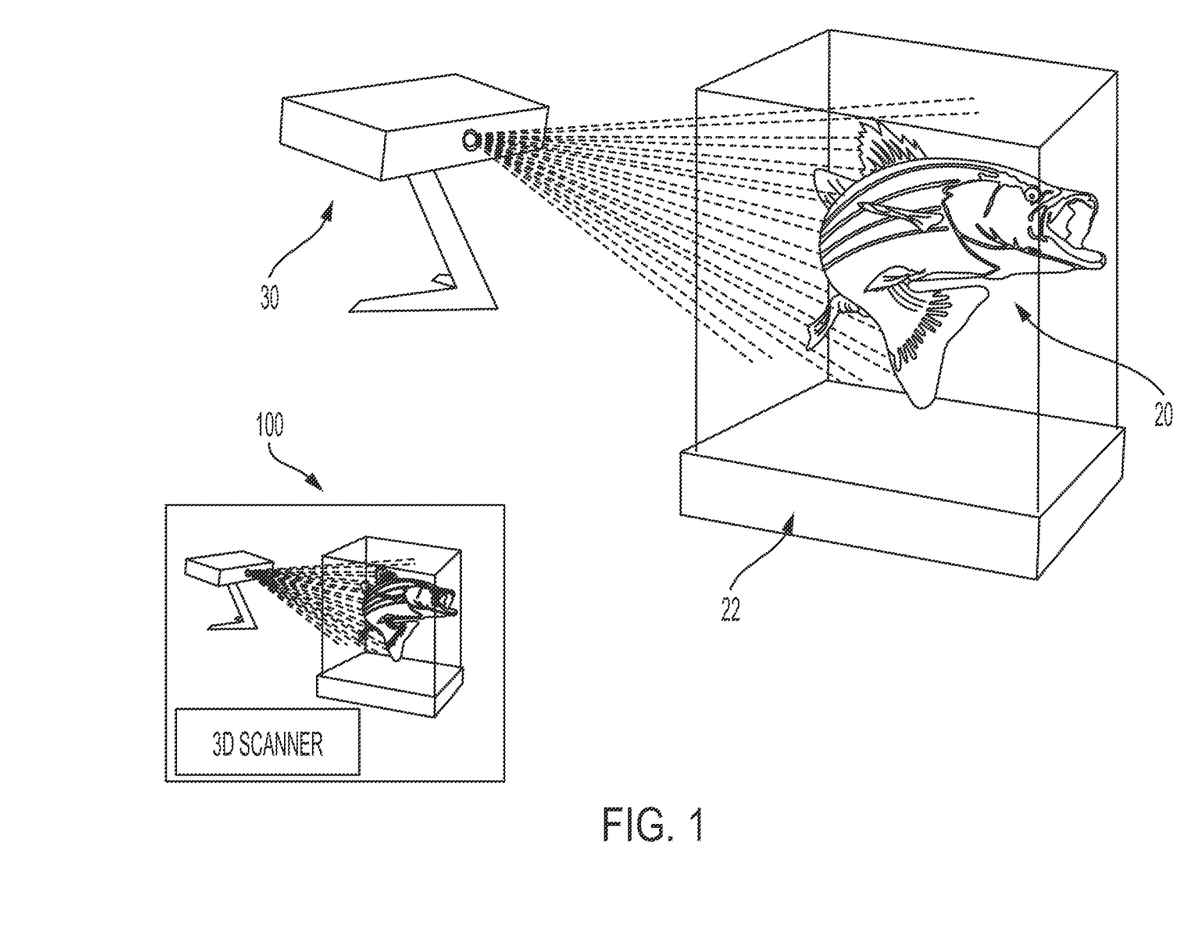
FIG. 1 is an isolated schematic perspective view of a scanner operative to acquire three-dimensional images of a wildlife subject.

In the described embodiment, the scanner 200 includes a vision system 30 which acquires information regarding the geometry and external features of the wildlife or gamefish subject. Depending upon the selected wildlife reproduction, more or less geometric data may be required to obtain an accurate representation of its external contour. Inasmuch as the data required, i.e., the density of the data for an accurate representation, may be too large or too complex for the requirements, a data reduction technique may be employed to simplify the three-dimensional printing required to render the 3D reproduction 500. For example, many three-dimensional printers acquire tolerance dimensions to one-thousands of an inch (0.001") for the purpose of satisfying certain applications, e.g., an aerospace application. Furthermore, since digital rendering is a function of these tolerance requirements, the speed associated with 3D printing will be reduced accordingly. To increase the speed of the 3D printing/rendering, it may be desirable to run a data filtering subroutine to reduce the data collected for 3D printing/rendering of the wildlife subject 20.

In one embodiment, the three-dimensional digital image scanner 200 may scan a three-dimensional specimen to acquire the three-dimensional digital image file. A first side of the three-dimensional specimen may be scanned, followed by the scanning of the second side of the specimen. Alternatively, the portions may be individually scanned, knitted and/or combined together to produce a composite of the specimen. Additionally, should a three-dimensional specimen be unavailable for scanning, two or more 2D images, i.e., photographs, may be combined by photogrammetry to develop a three-dimensional image of the wildlife or gamefish subject 20.

Figure 3:
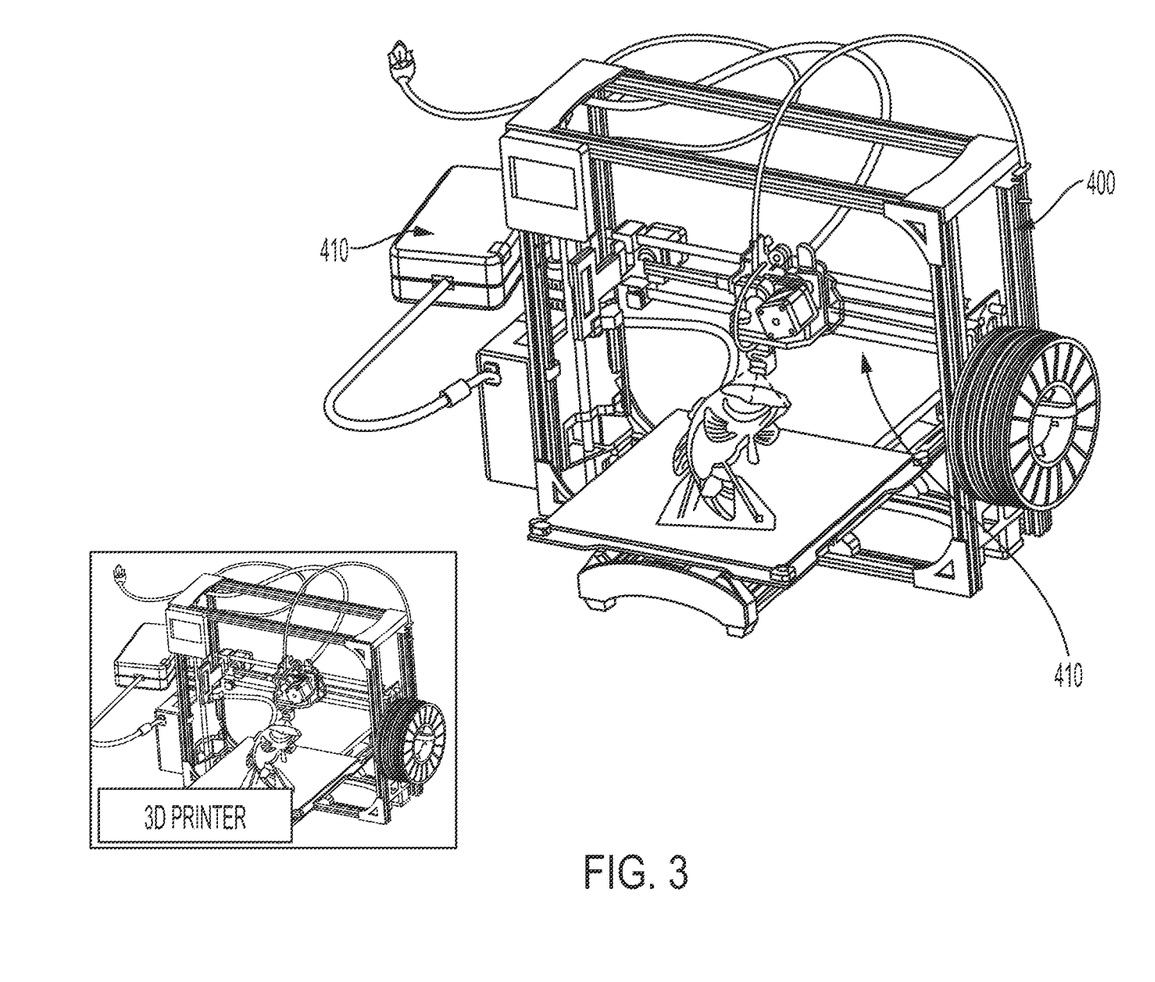
FIG. 3 is an isolated schematic perspective view of a three-dimensional printer capable of printing accurate three-dimensional replicas of a selected wildlife subject from three-dimensional image files produced by the scanner.
Figure 4:
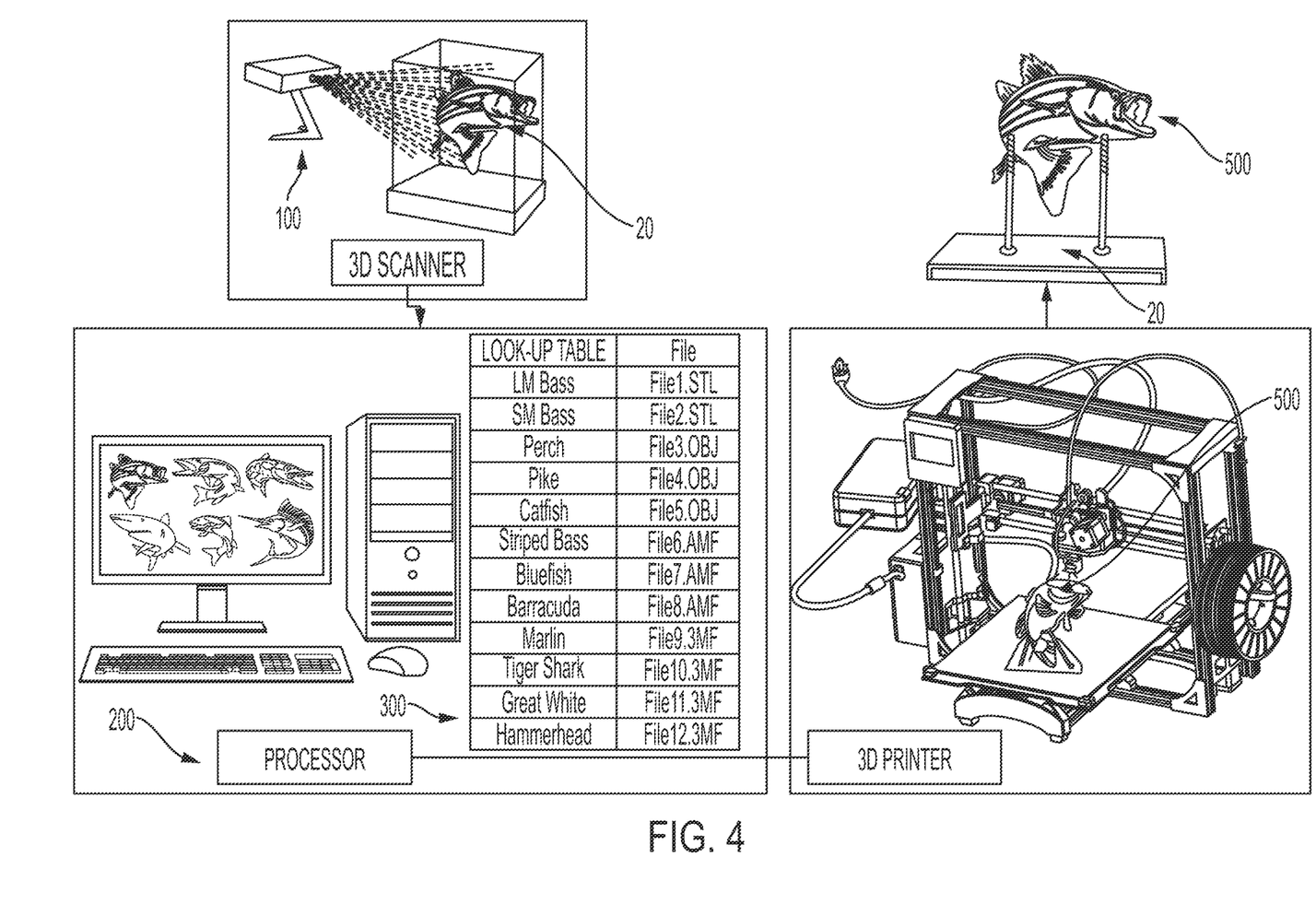
FIG. 4 is a schematic of a system and method for producing wildlife reproductions and game fish replicas using rapid prototyping tools/techniques.

In the described embodiment, the external colors or features of the wildlife specimen or subject may be obtained by a photograph for subsequent painting. Alternatively, the scanner may acquire the chromaticity coordinates directly from the scanned specimen, or from an accurate photograph. Thereafter, the processor 200 issues command signals to the 3D printer to integrate color directly into the printed reproduction 500 of the gamefish or wildlife subject.

Figure 7:
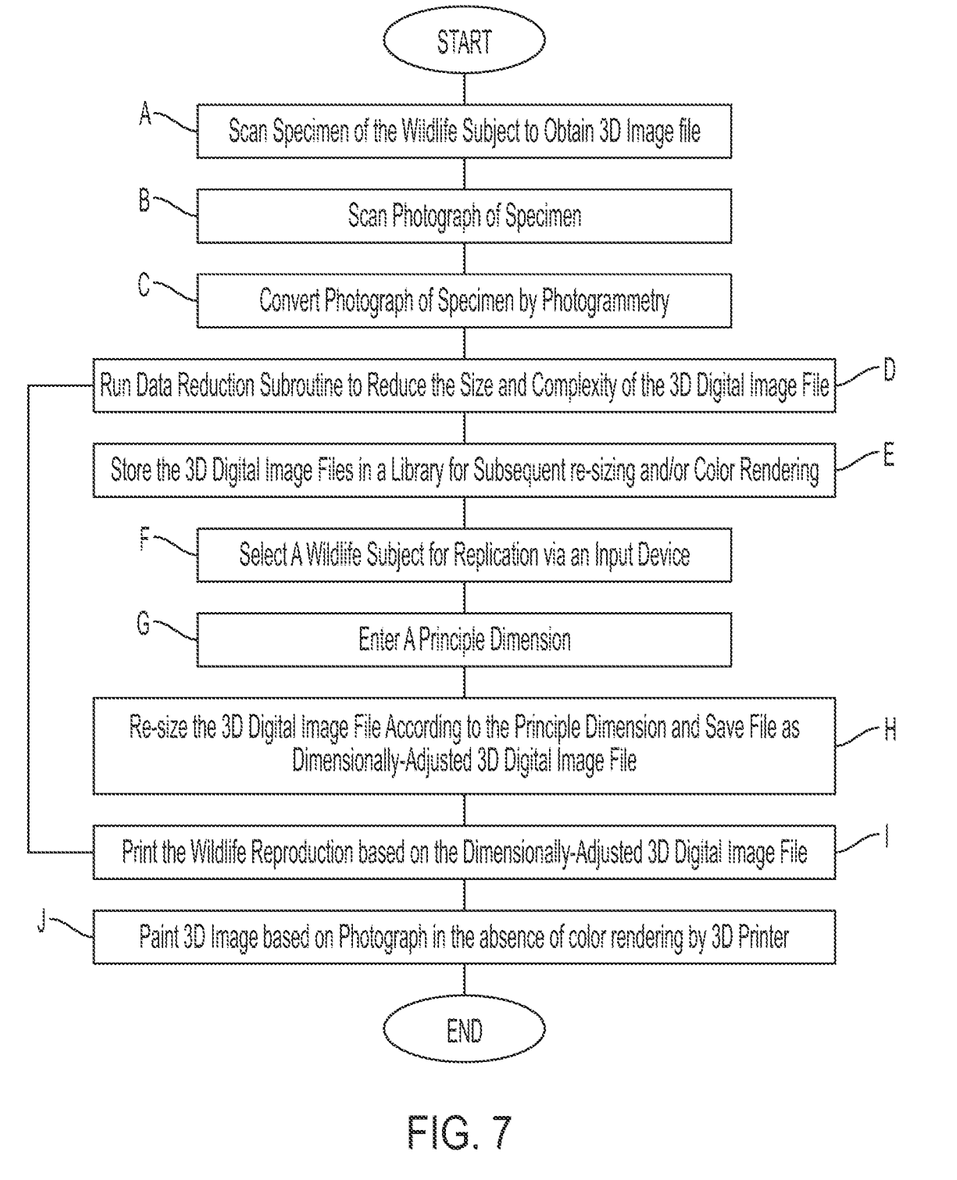
FIG. 7 depicts the method steps for replicating a wildlife reproduction of a selected wildlife subject.

In the method shown in FIG. 7, a specimen of the wildlife subject 20 is scanned, in Step A, to obtain a three-dimensional image file 300 of the subject 20. If the lighting was poor, or simply not indicative of the actual environment, a photograph may be used, in Step B, to augment or supplant the chromaticity/color data associated with the wildlife subject. Should a specimen be unavailable in step A, the photograph employed in step B may be used in step C to develop a three-dimensional image file through a process known as photogrammetry. Generally, it is helpful to have several photographs revealing an object or specimen from various angles to give more information through the height and length of structures/shadows.

As eluded to in a subsequent paragraph, it may be helpful or advisable to reduce the size and/or complexity of the 3D digital image file. That is, since the data required to accurately render a three-dimensional image of a gamefish is significantly lower than the data required to accurately render an aerospace component, i.e., an airfoil surface, then steps can and should be taken to reduce the complexity and increase the speed required to render a three-dimensional image of the subject gamefish. In step D, therefore, a data reduction subroutine, or lossy compression algorithm, can be run to filter, or essentially de-compress, the data acquired by the three-dimensional scanner.

In Step E, the three-dimensional image files are stored in a library for subsequent re-sizing and/or color rendering. In step F, a user/operator selects a wildlife subject 20 for which a replica or reproduction is desired. The selection may be made by any conventional input device such as a keyboard or mouse 22. In Step G, a principal dimension may be chosen to vary or increase the size of the replica. For example, an angler who has recently landed a trophy or record setting gamefish, may desire that a replica be made of his record setting catch. That is, the angler may be sensitive to removing a gamefish from the environment that it has successfully navigated for as many as 20 years.

In step H, the operator runs a re-sizing algorithm which properly proportions the other dimensions of the gamefish, e.g., the girth, fins, height, etc., and saves a dimensionally-adjusted 3D digital image file to the database 300. Finally, in steps I and J, the 3D printer begins to laser cure, layer-upon-layer, incremental slices of the selected gamefish. In this step, the processor 200 instructs the printer to cure each layer in much the same manner has an integral function measures and adds each rectangular slice for measuring the area under a curve. In step J, the processor 200 also integrates the materials, i.e., colored resins, to produce an external appearance corresponding to the photograph.

In yet another embodiment, the essence of "catch and release," includes placing the wildlife subject in a fixture, tank or other enclosure to hold the wildlife subject in a relatively calm and/or motionless state for a short period of time. For example, a portable glass enclosure or tank can be filled with water for receiving a subject gamefish. The portable glass enclosure may be fitted with scanning devices disposed at each corner of the enclosure or along at least two sides thereof such that a three dimensional image of the gamefish can be acquired. Additionally, photographic equipment can also be provided to obtain the color of the gamefish in its natural aquatic environment.

Once the data is captured, the gamefish can be returned to its home in the lake, river or ocean from which it was taken and momentarily inconvenienced. This is clearly a better option than forever removing the gamefish from its environment and depriving others of the same experience. The data can then be rendered by the three dimensional printer and printed to produce the wildlife replica. As mentioned earlier, depending upon the capability of the three dimensional printer, the wildlife replica can be reproduced with the proper coloring, i.e., with a mix of the various colored polymers in the resin, or subsequently painted according to a photograph of the wildlife subject. While this "catch/image/release" technique may be best suited for gamefish, one can envision or contemplate other enclosures for capturing the image data associated with other wildlife subjects.

Figure 8:
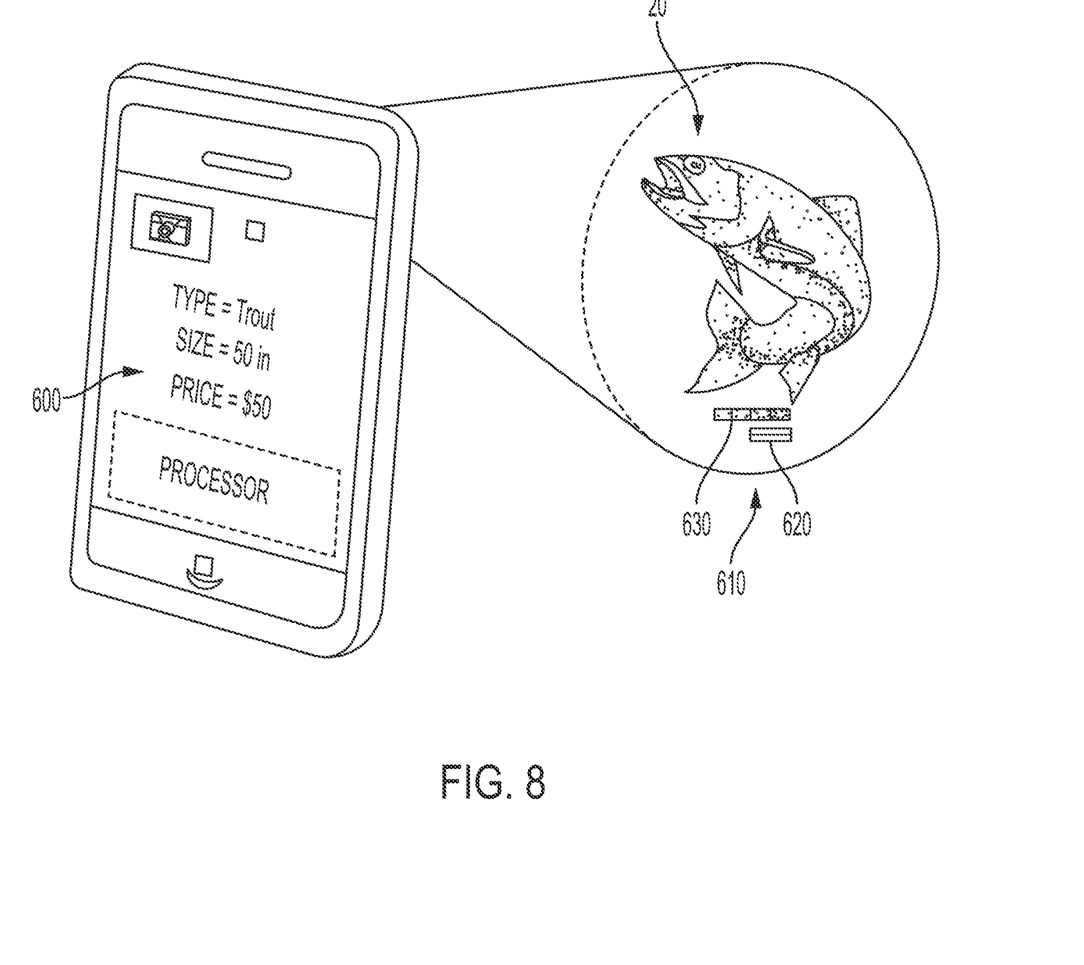
FIG. 8 depicts another embodiment of the system wherein a user employs a mobile device, in combination of reference devices providing size, scale and color information, to complete several steps of the method including the steps of (i) receiving/uploading a two dimensional image file, (ii) fabricating a wildlife reproduction based upon a variety of selected preferences.
Figure 9:
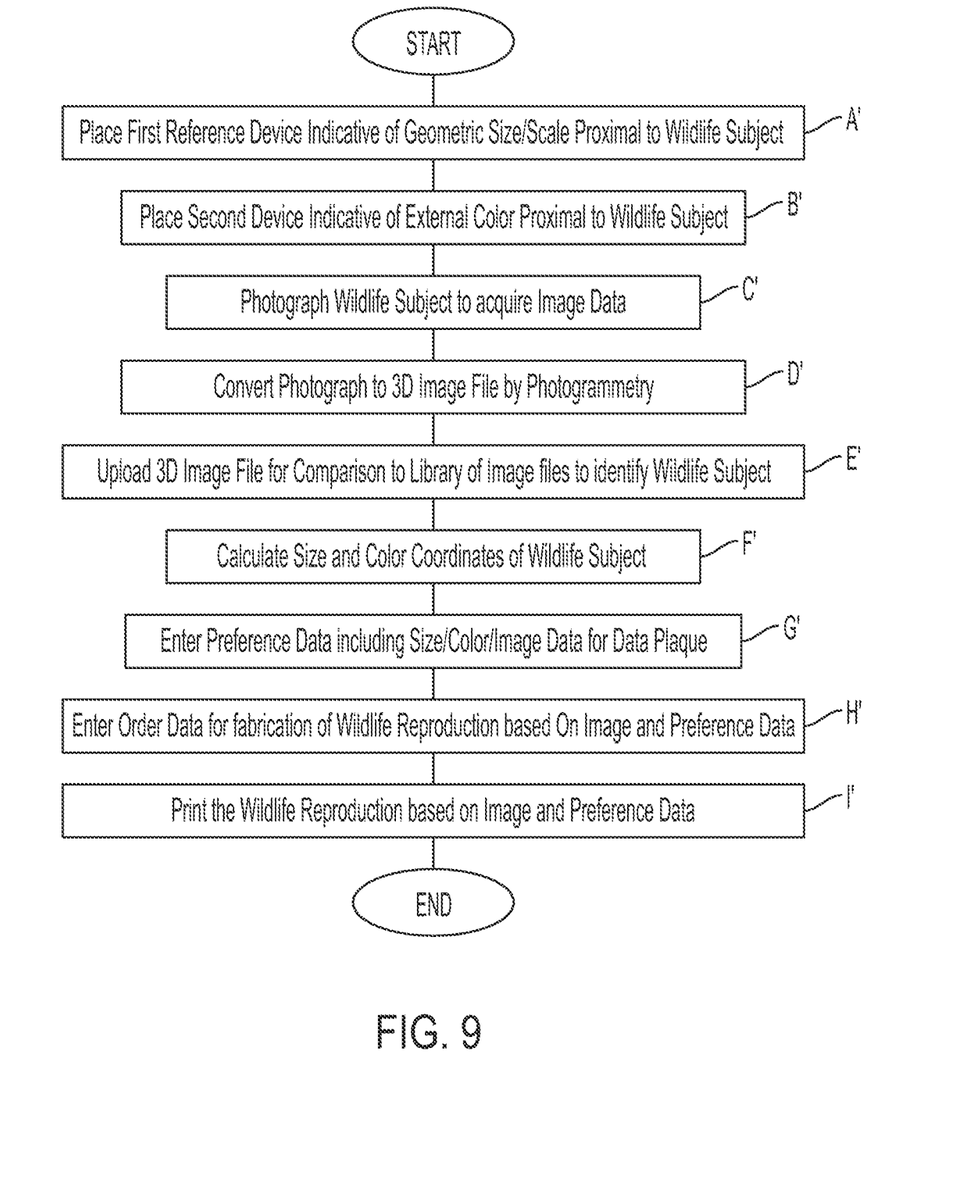
FIG. 9 depicts the method steps for replicating a wildlife subject using a mobile device.

In yet another embodiment, and referring to FIGS. 8 and 9, a mobile device 600 may be used in combination with one or more reference devices 610 to perform several steps of the method to rapidly and conveniently produce a wildlife replica. To perform the method according to this embodiment, a user will necessarily obtain one or more reference devices from a manufacturer capable of producing replicas in accordance with the teachings of this disclosure.

More specifically, in step A' of FIG. 9, a user may obtain a first reference 620 comprising a small three or six inch ruler to provide a reference for scale/size. Preferably, a device of known length may be provided from a manufacturer capable of producing high quality wildlife replicas (i.e., such as those contemplated in this disclosure.) The ruler, which is placed on or near the wildlife subject, establishes a measure of scale so that the processor 200 may calculate length, height, girth, thickness, fin dimensions, eye diameter, etc., with a high degree of accuracy. In step B', a second reference 630 may comprise one or more well-defined color patches or samples disposed on a small tab or attached to the face of the ruler 620. The chromaticity coordinates of the color patch/sample may be known to the processor 200 receiving the image data such that any variations or differences in color due to slight deviations in the photographic quality from one imaging device to another may be calculated, compensated and corrected.

In Step C', the operator/sportsman/angler takes a series of photographs around the wildlife subject 20. Certain photogrammetry algorithms/programs require that as many as one-hundred and twenty (120) photographs be taken, approximately thirty degrees apart, i.e., around the wildlife subject 20, to convert the two dimensional photograph into a three dimensional image. To take this many photographs it will be appreciated that the wildlife subject 20 may be temporarily sedated, restrained or otherwise immobilized while a user photographs the wildlife subject. Generally, the task of taking the number of photographs required by such photogrammetry algorithms will be performed by an individual compiling the data for the memory/storage database. The sportsman/angler will generally take and supply a single photograph, principally for the purpose of establishing the size and color of the gamefish or wildlife subject. In step D', the processor 200 converts the two dimensional photographic images into a three dimensional image by the photogrammetry algorithm/program. In step E', the three dimensional image may be compared to a library of image files to identify the wildlife subject. Generally, the only need for this step is to confirm that the processor 200 will be performing the subsequent steps with the correct initial baseline.

In step F, the processor 200 may calculate the size/color of the wildlife subject 20 based in the information obtained, and a comparison made between, the reference devices 620, 630 and the library of image data (FIG. 6.) The reference devices 620, 630 may be any one of a variety of devices having a known dimension or chromaticity coordinates. For example, a manufacturer of wildlife replicas may provide a card (similar to a credit card) having a ruler printed or integrated within the card along with a color spectrum for the purpose of establishing the size and color of the wildlife subject. The card, which may contain information about the manufacturer (i.e., contact information), will facilitate accurate color data regardless of the lighting conditions or exposure of the photograph taken by the sportsman. While a card may be used, variety of other objects may be used for establishing size and color of the wildlife subject. For example, a banner or sticker printed or painted within or on a sports-fishing boat may be employed for this purpose. Alternatively, the sticker or banner may be printed on or integrated in a gun stock, or knife handle. This may also serve as an excellent opportunity to advertise the manufacturer by including the logo or name of the manufacturer on the boat, gun stock, knife handle, etc. As a result the sportsman is reminded of who and where a wildlife replica can be produced.

Once the baseline information is obtained and evaluated, in Step G', the user may enter specific preference data. For example, the user may want a specific mounting method or pose for its wildlife replica. Alternatively, the user may want to change certain dimensions or colors such that certain features stand out. For example, the user may desire a larger replica or a smaller replica. In an embodiment, the obtained baseline information may be scaled to be used for the production of a fishing lure or other hunting equipment.

In step H', the user may order the replica immediately following a catch and, in Step I', the replica can begin being molded/NC machined, as the sportsman/angler returns to his day of fishing or hunting. With respect to the latter, and specifically addressing wildlife game such as a bear or a buck, the wildlife game can be skinned such that the musculoskeletal tissue remains. Once again, photographs may be taken around the animal such that photogrammetry can yield a three dimensional image of the animal. The three dimensional image can be used by a Numerically Controlled (NC) machine with a three-axis cutting tool such that a block of wood or dense foam may be machined/used as the underlying support for the skin, one tanned and dried.

Additional embodiments include any one of the embodiments described above, where one or more of its components, functionalities or structures is interchanged with, replaced by or augmented by one or more of the components, functionalities or structures of a different embodiment described above. For example, it should be appreciated that the present invention may be practiced without harming or killing a fish. Accordingly, the method may be practiced with a "catch and release" approach. It should also be appreciated that the molded reproduction will incorporate artificial or glass eyes which may be difficult to mimic eye color. Additionally, size (i.e., length and girth) and color may be readily varied. For example, the dimensions of a game fish may be scaled down in order to produce a fishing lure.

Furthermore, the printed reproductions may be used as "decoys" (similar to a duck decoy) and may be used to create traditional molds for injection molding. As mentioned supra, the size of the reproduction may be altered by a simple increase or decrease in data dimension. While the size may be tailored to replicate smaller and larger specimens, it should also be understood that a mold of the replica can be produced for molding large statue, or miniature size reproductions. For example, a bronze statue can be made using the replica mold or key-chain sized, resin injection molded, reproduction of the wildlife reproduction or game fish replica.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A system for fabricating replicas of wildlife reproductions, comprising:
    a scanning device configured to optically acquire digital images of wildlife subjects, the digital images of each wildlife subject being saved to a library of digital image files within a computer database, wherein each digital image of the wildlife subject is assigned a principal dimension from which all other dimensions of the wildlife subject are based;
    a three-dimensional printer operative to produce three-dimensional reproductions of wildlife subjects;
    a processor having program code for: (i) accessing the library of digital image files within the computer database (ii) responding to an input command signal selecting a three-dimensional digital image file of a selected wildlife subject; and (iii) issuing command signals to the three-dimensional printer to print the three-dimensional digital image file of the selected wildlife subject; and
    one or more reference devices configure to be positioned proximate to the wildlife subject,
    wherein the program code of the processor (i) determines a value of a principal dimension of a captured wildlife subject using the one or more reference devices; (ii) compares the value of the principal dimension of the captured wildlife subject with the principal dimension of the selected three-dimensional digital image file to determine a dimensional adjustment of the principal dimension from which dimensional adjustments to at least one other dimension of the selected wildlife subject is calculated, (iii) transforms the digital image file to an adjusted three-dimensional digital image file corresponding to the principal dimension of the wildlife subject and (iv) issues command signals to the three-dimensional printer to print the digital image file of the selected wildlife subject based on the adjusted three-dimensional digital image file.

2. The system for fabricating replicas of wildlife reproductions according to claim 1,
wherein a color command signal associated with the wildlife subject is input by chromaticity coordinates issued by the one of: (i) an optical vision system and (ii) a photograph of the wildlife subject, and
wherein the processor controls the fabrication of the three dimensional printer such that the color of the wildlife subject is replicated in the wildlife reproduction.

3. The system for fabricating replicas of wildlife reproductions according to claim 1,
wherein the scanning device is a three-dimensional scanner for acquiring the three dimension digital image file of the wildlife subject from a wildlife specimen thereof.

4. The system for fabricating replicas of wildlife reproductions according to claim 1,
wherein the scanning device is a two dimensional scanner acquiring a two dimensional digital image of a two dimensional photograph of the wildlife subject, and
wherein the processor employs photogrammetry to develop a corresponding three-dimensional digital image file.

5. The system for fabricating replicas of wildlife reproductions, according to claim 1,
wherein optical characteristics of the wildlife reproduction, including external features of the wildlife subject are integrated within print materials for producing the wildlife reproductions.

6. The system for fabricating replicas of wildlife reproductions according to claim 5,
wherein a vision system acquires a three dimension digital image of the wildlife subject from a specimen thereof.

7. The system for fabricating replicas of wildlife reproductions according to claim 5,
wherein a vision system acquires a three dimension digital image of the wildlife subject from a photograph thereof.

8. The system of fabricating replicas of wildlife reproductions according to claim 5,
wherein a vision system acquires chromaticity coordinates of the wildlife subject while scanning the wildlife subject for use by the three-dimensional printer when replicating an external color of the wildlife subject.

9. The system of fabricating replicas of wildlife reproductions according to claim 8,
wherein the vision system acquires chromaticity coordinates of the wildlife subject from a photograph of the wildlife subject for use by the three-dimensional printer when replicating the external color of the wildlife subject.

10. The system of fabricating replicas of wildlife reproductions according to claim 1, wherein the one or more reference devices further comprises one or more color patches comprising chromaticity coordinates that are known to the processor.

11. The system of fabricating replicas of wildlife reproductions according to claim 10, wherein the program code of the processor detects and corrects for variations in the one or more color patches due to deviations in photographic quality from one imaging device to another.

* * * * *